(12) United States Patent
Chopko et al.

(10) Patent No.: US 10,202,023 B2
(45) Date of Patent: Feb. 12, 2019

(54) HYBRID REFRIGERATION SYSTEM FOR A MOBILE UNIT AND METHOD OF OPERATION

(71) Applicant: Carrier Corporation, Jupiter, FL (US)

(72) Inventors: Robert A. Chopko, Baldwinsville, NY (US); John R. Reason, Liverpool, NY (US); Mark J. Perkovich, Fayetteville, NY (US)

(73) Assignee: Carrier Corporation, Jupiter, FL (US)

( * ) Notice: Subject to any disclaimer, the term of this patent is extended or adjusted under 35 U.S.C. 154(b) by 197 days.

(21) Appl. No.: 15/384,422

(22) Filed: Dec. 20, 2016

(65) Prior Publication Data

US 2017/0100987 A1 Apr. 13, 2017

Related U.S. Application Data

(62) Division of application No. 13/504,813, filed as application No. PCT/US2010/054255 on Oct. 27, 2010, now Pat. No. 9,557,100.

(60) Provisional application No. 61/255,318, filed on Oct. 27, 2009.

(51) Int. Cl.
*F25D 29/00* (2006.01)
*B60H 1/32* (2006.01)
*F25B 27/00* (2006.01)

(52) U.S. Cl.
CPC ......... *B60H 1/3226* (2013.01); *B60H 1/3211* (2013.01); *F25B 27/00* (2013.01); *F25D 29/003* (2013.01); *B60H 2001/327* (2013.01); *B60H 2001/3255* (2013.01); *B60H 2001/3292* (2013.01); *F25D 2700/123* (2013.01)

(58) Field of Classification Search
CPC ............ B60H 1/00828; B60H 1/00864; B60H 1/00278; F25B 2600/112; F25D 11/003
See application file for complete search history.

(56) References Cited

U.S. PATENT DOCUMENTS

| 2,650,534 | A | 11/1953 | Smith |
| 2,694,970 | A | 11/1954 | Schneider |
| 3,455,118 | A | 7/1969 | Petranek |
| 3,976,458 | A | 8/1976 | Krug |
| 5,105,096 | A | 4/1992 | Waldschmidt et al. |
| 5,265,435 | A | 11/1993 | Richardson |
| 5,896,750 | A | 4/1999 | Karl |

(Continued)

FOREIGN PATENT DOCUMENTS

| GB | 2211922 | 4/1988 |
| JP | 5039968 | 2/1993 |

(Continued)

*Primary Examiner* — Ljiljana Ciric
*Assistant Examiner* — Alexis Cox
(74) *Attorney, Agent, or Firm* — O'Shea Getz P.C.

(57) ABSTRACT

A method for operating a refrigeration system for a mobile unit includes steps of: 1) providing a refrigeration unit having a compressor, an evaporator, and at least one fan operable to move air towards the evaporator, a generator dedicated to the refrigeration unit, and a battery; 2) determining at least one environmental parameter in one or both of the mobile unit and the refrigeration unit; and 3) selectively operating the refrigeration unit in one of a plurality of modes based on the environmental parameter. The plurality of modes includes a first mode wherein at least the fan is powered by the battery, and a second mode wherein the compressor and the fan are powered by the generator.

16 Claims, 2 Drawing Sheets

(56) References Cited

U.S. PATENT DOCUMENTS

| | | |
|---|---|---|
| 5,916,253 A | 6/1999 | Amr et al. |
| 6,116,037 A | 9/2000 | Burnett |
| 6,688,125 B2 | 2/2004 | Okamoto et al. |
| 6,701,734 B1 | 3/2004 | Ogawa |
| 6,742,350 B2 | 6/2004 | Suzuki et al. |
| 6,755,041 B2 | 6/2004 | Wessells et al. |
| 6,761,037 B2 | 7/2004 | Tsuboi et al. |
| 7,127,903 B2 | 10/2006 | Kuribayashi |
| 7,150,159 B1 | 12/2006 | Brummett et al. |
| 7,689,330 B2 | 3/2010 | Moran |
| 2002/0108388 A1 | 8/2002 | Wilson et al. |
| 2002/0185546 A1 | 12/2002 | Homan et al. |
| 2003/0000236 A1 | 1/2003 | Anderson et al. |
| 2004/0168454 A1 | 9/2004 | Iritani |
| 2006/0112702 A1 | 6/2006 | Martin et al. |
| 2007/0052241 A1 | 3/2007 | Pacy |
| 2007/0131408 A1 | 6/2007 | Zeigler et al. |
| 2008/0006045 A1 | 1/2008 | Brummett |
| 2008/0066476 A1 | 3/2008 | Zhu et al. |
| 2008/0092586 A1 | 4/2008 | Kitaichi et al. |
| 2008/0103635 A1 | 5/2008 | Vuk et al. |
| 2008/0110189 A1 | 5/2008 | Alston et al. |
| 2009/0056354 A1 | 3/2009 | Davis et al. |
| 2009/0165479 A1 | 7/2009 | Lin et al. |
| 2009/0229288 A1 | 9/2009 | Alston et al. |
| 2009/0314019 A1 | 12/2009 | Fujimoto et al. |
| 2010/0019047 A1 | 1/2010 | Flick |

FOREIGN PATENT DOCUMENTS

| | | |
|---|---|---|
| JP | 2004123022 | 4/2004 |
| JP | 2007309608 | 11/2007 |
| WO | 2008090949 | 7/2008 |
| WO | 2009008859 | 1/2009 |

HYBRID REFRIGERATION SYSTEM FOR A MOBILE UNIT AND METHOD OF OPERATION

This patent application is a divisional of U.S. patent application Ser. No. 13/504,813 filed Apr. 27, 2012, which claims priority to PCT Patent Application No. PCT/US10/54255 filed Oct. 27, 2010, which claims priority to U.S. Provisional Patent Application No. 61/255,318 filed Oct. 27, 2009, the disclosures of which are hereby incorporated herein by reference in their entirety.

BACKGROUND OF THE INVENTION

1. Technical Field

This disclosure relates generally to heat exchange systems and, more particularly, to a hybrid refrigeration system for a mobile unit.

2. Background Information

Heat exchange systems can be used to regulate environmental conditions within a mobile unit (e.g., a vehicle, a truck container, a truck trailer, a shipping container, etc.). Typically, heat exchange systems are powered either directly or indirectly by an internal combustion engine. The engine may be operated during high load conditions (e.g. when the heat exchange systems require/draw a relatively large quantity of power), during low load conditions (e.g. when the heat exchange systems require a relatively small quantity of power), and during idle conditions (e.g. when the heat exchange systems are idle and require no power).

In an effort to reduce energy consumption and costs associated therewith, it is known to operate the engine of a heat exchange system in an operational mode where the engine is subject to periods of operation and periods of rest. This mode of operation can be referred to as a "start and stop" mode of operation. One of the issues with the start and stop mode of operation is that when the engine is needed but the load on the heat exchange system is low, the engine may produce more power than the heat exchange system requires, which negatively effects the efficiency of the system. Another issue with the start and stop mode is that when the system is not operating, the air within the mobile unit is likely to be not circulating. As a result, localized thermal hotspots (and associated steep temperature variances) may form within the mobile unit. The formation of these hotspots can lead to inaccurate temperature readings and reduce the efficiency of the system. For example, if the temperature of the air proximate a sensor within the mobile unit is higher or lower than air elsewhere within the unit, the information provided by the sensor and any actions based on that information may be suspect. To reduce these inaccurate readings, some prior art systems "prime" the sensors within the mobile unit. The term "prime" is used to refer to scenarios where the prior art heat exchange system, including the engine, is run to circulate air within the mobile unit for a period of time until the temperature of the air within the mobile unit is more uniformly distributed. However, similar to low load conditions, the engine used to create the circulation typically produces more power than is required to "prime" the system and energy is consequently wasted. There is, therefore, a need in the art for a heat exchange system that reduces energy consumption during low load conditions.

SUMMARY OF THE DISCLOSURE

According to one aspect of the invention, a method for operating a refrigeration system for a mobile unit includes the steps of: 1) providing a refrigeration unit having a compressor, an evaporator, and at least one fan operable to move air towards the evaporator, a generator dedicated to the refrigeration unit, and a battery; 2) determining at least one environmental parameter in one or both of the mobile unit and the refrigeration unit; and 3) selectively operating the refrigeration unit in one of a plurality of modes based on the environmental parameter, which plurality of modes includes a first mode wherein at least the fan is powered by the battery, and a second mode wherein the compressor and the fan are powered by the generator.

According to another aspect of the invention, a refrigeration system for a mobile unit is provided. The refrigeration system includes a refrigeration unit, a battery and a controller. The refrigeration unit includes a compressor, an evaporator, a generator, and at least one fan operable to move air through the evaporator. The generator is dedicated to the refrigeration unit. The controller is adapted to selectively operate the refrigeration unit in one of a plurality of modes based on an environmental parameter within the mobile unit, which plurality of modes includes a first mode wherein the fan is powered by the battery, and in a second mode wherein the compressor and the fan are powered by the generator.

DETAILED DESCRIPTION OF THE INVENTION

Figure 1:
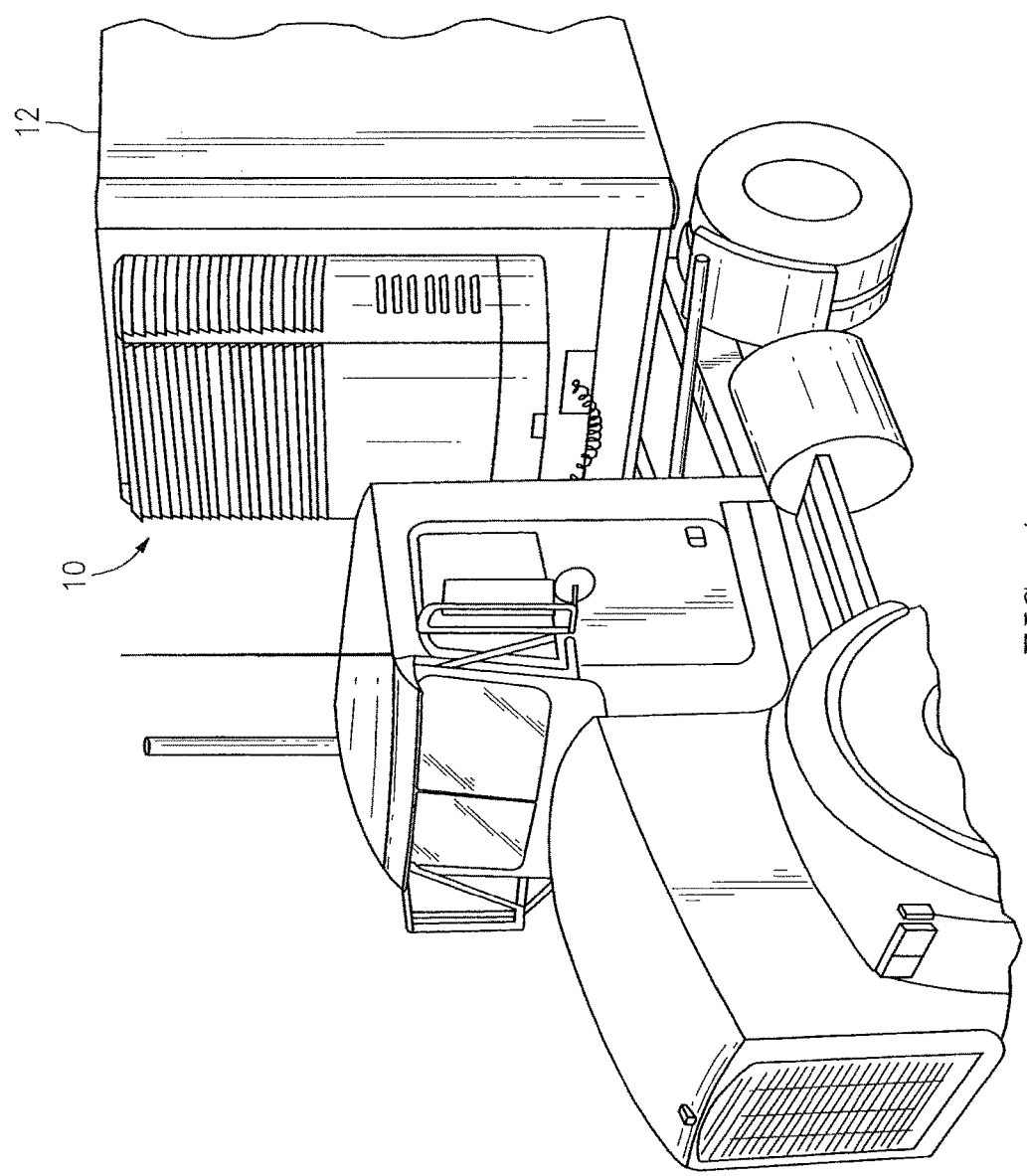
FIG. 1 is a diagrammatic illustration of one embodiment of a refrigeration system for regulating environmental conditions in a mobile unit.

FIG. 1 illustrates a mobile refrigeration unit 10 operable to regulate environmental conditions (e.g., air temperature) in a truck trailer 12. Mobile refrigeration units 10 can also be used with box trucks, buses, shipping containers, etc. The portion of the trailer 12 or other container that is to be environmentally maintained by the refrigeration unit 10 is referred to hereinafter as the "control region".

Figure 2:
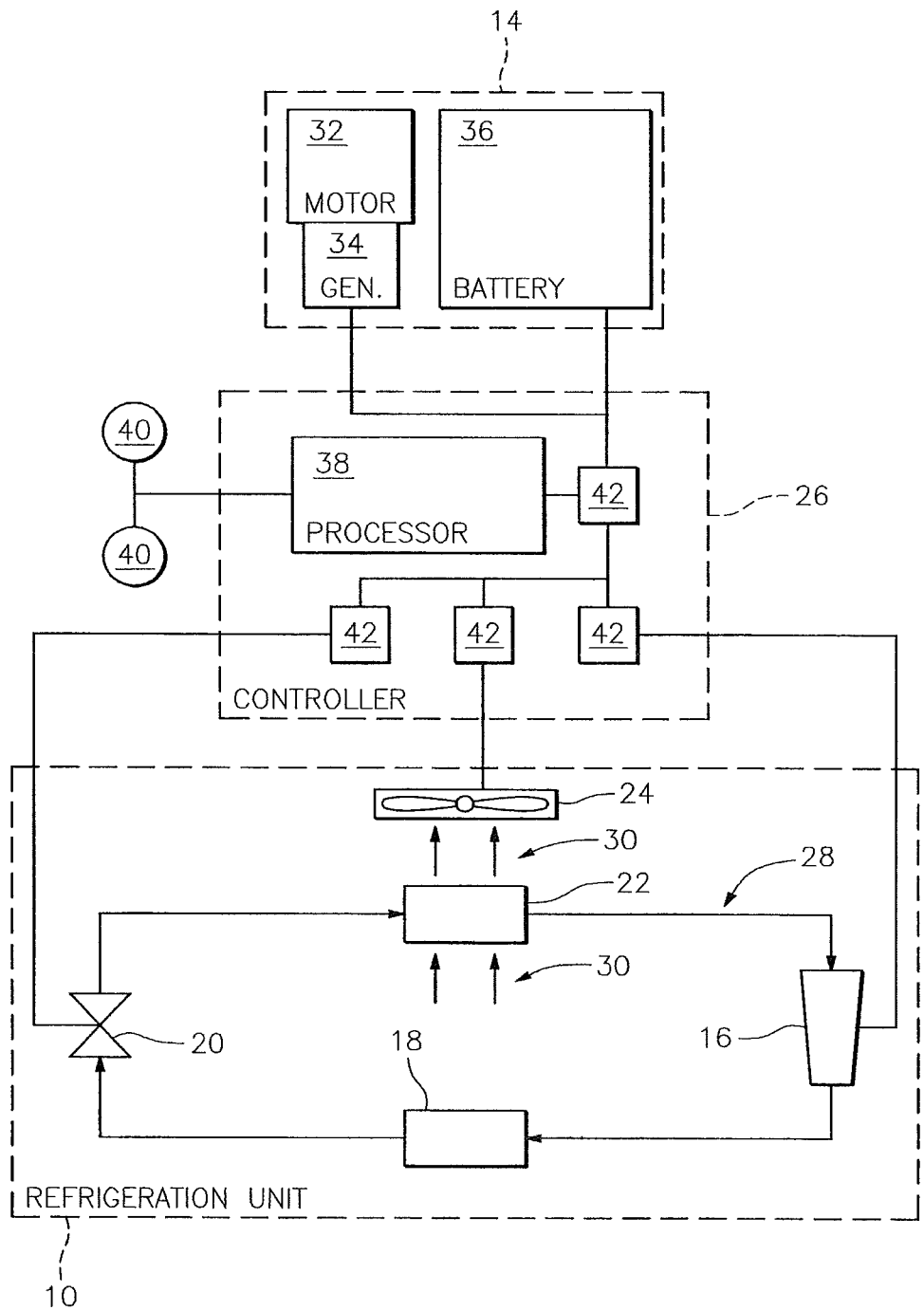
FIG. 2 is a diagrammatic illustration of one embodiment of the refrigeration system in FIG. 1.

A diagrammatic illustration of an embodiment of a refrigeration unit 10 is shown in FIG. 2. The refrigeration unit 10 includes a power package 14, a compressor 16, a condenser 18, a refrigerant regulator 20, an evaporator 22, at least one fan 24, and a control system 26 ("controller"). The refrigeration unit 10 is configured such that liquid refrigerant travels through the compressor 16, the condenser 18, the refrigerant regulator 20 and the evaporator 22 in a closed loop path 28. The fan 24 has an alternating current ("ac") motor or a direct current ("dc") motor and is configured to direct air 30 from the control region, and/or in some embodiments from outside the control region, through the evaporator 22, and back into the control region. A detailed example of a refrigeration unit is disclosed within U.S. Pat. No. 5,916,253, which is hereby incorporated by reference in its entirety.

The power package 14 includes a motor 32 coupled to a generator 34, and a battery 36. The power package 14 is adapted to power to one or more of the components of the refrigeration unit 10 (e.g. the compressor 16, the refrigerant regulator 20, the fan 24, the controller 26, etc.) and, in some embodiments to maintain or replenish the charge of the battery 36. An example of an acceptable motor 32 is a compact diesel engine of the type that is commonly used to power a refrigeration unit 10. An example of an acceptable generator 34 is a permanent magnet type DC generator. Alternatively, an AC alternator can be included in the power package 14. The power package 14 is dedicated to the refrigeration unit 10. The term "dedicated" is used to indicate that the refrigeration unit 10 derives all or substantially all of its power from the power package 14. The battery 36 is operable to provide electrical power to one or more of the refrigeration unit components (e.g., the compressor 16, refrigerant regulator 20, fan 24, controller 26, etc.). In some embodiments, the charge of the battery 36 is maintained or replenished using power received from the generator 34. Systems for maintaining or replenishing the charge of a battery 36 are well known in the art and further description is not required here for enablement purposes. The battery 36 may be a single unit or multiple units combined.

The controller 26 includes a processor 38 that is adapted to receive one or more feedback signals from one or more sensors 40, positioned within the control region and/or the refrigeration unit 10, indicative of an environmental parameter (e.g., temperature, pressure, humidity, etc.) within the control region, and/or feedback signals indicative of operating parameters of the refrigeration unit 10. The processor 38 is further adapted to selectively maintain or change the operating mode of the refrigeration unit 10, using actuators 42 (e.g., switches, valves, etc.) in communication with the refrigeration unit 10 based on the feedback signals, an algorithm, or some combination thereof. For example, a temperature value sensed within the control region may prompt the controller 26 to engage a non-operating refrigeration unit 10 to supply cooling air to the control region, or it may prompt the controller 26 to disengage an operating refrigeration unit 10. Similarly, an operating parameter value associated with the refrigeration unit 10 may prompt the controller 26 to engage a dormant refrigeration unit 10, or to disengage an operating refrigeration unit 10. It should be noted that the functionality of the processor 38 may be implemented using hardware, software, firmware, or a combination thereof. A person skilled in the art would be able to program the processing unit to perform the functionality described herein without undue experimentation.

The refrigeration unit 10 can be operated in a variety of different modes. In a first mode, for example, the controller 26 directs the refrigeration unit 10 to operate the fan 24 only to circulate air to and from the control region. The power to drive the fan 24 is provided by the battery 36, and the motor 32 and generator 34 of the power package 14 are maintained in non-operational mode. The other components of the refrigeration unit 10 (e.g., the compressor 16, etc.) are also maintained in non-operational mode.

In a second mode, the controller 26 directs the refrigeration unit 10 to operate the fan 24 to circulate air to and from the control region, and to operate at least one of the other components (e.g., the compressor 16, etc.) of the refrigeration unit 10. The power to drive the fan 24 and the other component is provided by the battery 36, and not by the motor 32 and generator 34 of the power package 14.

In a third mode, the controller 26 directs the refrigeration unit 10 to operate the fan 24 to circulate air to and from the control region, and operate at least one of the other components (e.g., the compressor 16, etc.) of the refrigeration unit 10. The power to drive the fan 24 and the other component is provided by motor 32 and generator 34 of the power package 14.

The above described modes of operation are examples of how the present refrigeration unit 10 may be operated, and the present refrigeration unit 10 should not be construed as being limited to these particular modes. Additional information regarding circumstances when these modes may be implemented is provided below.

In operation of the present refrigeration unit 10, the controller 26 receives the feedback signal(s) indicative of the environmental parameter(s) in the control region and/or the operational parameter(s) of the refrigeration unit 10. If, for example, the feedback signals indicate that the refrigeration unit 10 should be operating in a low load condition (e.g., temperature sensed within the control region is equal to or below the desired temperature for a cooling application), the controller 26 may operate the refrigeration unit 10 according to the first mode, wherein the battery 36 is used to power the fan 24 alone to circulate air to and from the control region. In some applications, the controller 26 may dictate a variable air flow rate created by the fan 24 based on feedback signals.

While operating in the first mode, the circulation of the air may reduce or prevent the formation of regional thermal hotspots within the control region. The speed and extent to which the air circulation will eliminate the regional hotspots will depend upon factors including the volumetric flowrate of the fan 24, the configuration of objects within the control region, the size of the control region, etc. Once an effective flow rate of air is circulated, the sensors 40 are apt to determine temperature values that are more representative of the average temperature within the control region, as opposed to a disparate regional temperature values. Consequently, it may be possible to reduce or eliminate associated sensor priming periods. In the first mode, the refrigeration unit 10 can be operated for a period of time without running the motor 32 and generator 34 of the power package 14. Consequently, whatever fuel would have been consumed by the motor 32 is saved. What constitutes a "low load" condition can be determined for the particular application and the controller 26 can be appropriately adapted.

If the feedback signals are indicative of a medium load condition (e.g., when the temperature sensed in the control region is within a predetermined temperature range), the controller 26 may operate the refrigeration unit 10 according to the second mode, wherein the battery 36 is used to power the fan 24 and one or more of the other components of the refrigeration unit 10. In the second mode, the fan 24 and one or more other components of the refrigeration unit (e.g. the compressor 16, etc.) are operated for a period of time without engaging the motor 32. Hence, whatever fuel would have been consumed by the motor 32 is saved. What constitutes a "medium load" condition can be determined for the particular application and the controller 26 can be appropriately adapted.

If the feedback signals are indicative of a high load condition (e.g., the sensed environmental temperature in the control region above the first predetermined range of temperatures), the controller 26 may operate the refrigeration unit 10 according to the third mode, wherein the motor 32 is operated to power the entire refrigeration unit 10. In the third mode, the charge of the battery 36 can be replenished. What constitutes a "high load" condition can be determined for the particular application and the controller 26 can be appropriately adapted.

The controller 26 can also be adapted to sense the level of charge within the battery 36. If the charge within the battery 36 drops below a predetermined value, the refrigeration unit 10 can be operated within the third mode until the battery 36 is charged.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A refrigeration system for a mobile unit, comprising:
a refrigeration unit including a compressor, an evaporator, a generator, and at least one fan operable to move air towards the evaporator, wherein the generator is dedicated to the refrigeration unit;
a battery; and
a controller adapted to selectively operate the refrigeration unit in one of a plurality of modes based on an environmental parameter within the mobile unit, which plurality of modes includes a first mode where the fan is powered by the battery, and a second mode where the compressor and the fan are powered by the generator.

2. The system of claim 1, wherein in the first mode the generator and the compressor are non-operational.

3. The system of claim 1, further comprising at least one sensor adapted to determine the environmental parameter within the mobile unit.

4. The system of claim 3, wherein the sensor is disposed within the refrigeration unit.

5. The system of claim 1, wherein the dedicated generator is configured to charge the battery during the second mode.

6. The system of claim 1, wherein the mobile unit is one of a truck trailer, a box truck, a bus, and a shipping container.

7. The system of claim 1, wherein in the first mode the fan and the compressor are powered by the battery.

8. A refrigeration system for a mobile unit, comprising:
a refrigeration unit including a compressor, an evaporator and a fan operable to move air towards the evaporator;
a generator being dedicated to the refrigeration unit;
a battery;
at least one sensor; and
a controller configured to determine an environmental parameter in one or both of the mobile unit and the refrigeration unit using data received from the at least one sensor; and
the controller configured to select a mode in which to operate the refrigeration unit based on the environmental parameter, wherein the selected mode is one of a plurality of modes in which the refrigeration unit is capable of operating, and wherein the plurality of modes comprise (A) a first mode where at least the fan is powered by the battery and (B) a second mode where the compressor and the fan are powered by the generator; and
the controller further configured to operate the refrigeration unit in the selected mode.

9. The system of claim 8, wherein, in the first mode, the generator and the compressor are non-operational.

10. The system of claim 8, wherein the sensor is disposed within the refrigeration unit.

11. The system of claim 8, wherein the dedicated generator is configured to charge the battery during the second mode.

12. The system of claim 8, wherein the mobile unit is a truck trailer, a box truck, a bus or a shipping container.

13. The system of claim 8, wherein, in the first mode, the fan and the compressor are powered by the battery.

14. The system of claim 8, wherein, in the second mode, the generator charges the battery.

15. The system of claim 8, wherein the environmental parameter is indicative of a temperature within the mobile unit.

16. The system of claim 15, where the at least one sensor is disposed within the mobile unit to determine the at least one environmental parameter.

* * * * *